Patented May 11, 1954

2,678,330

UNITED STATES PATENT OFFICE 2,678,330

BIS-(2,3-DIHALOPROPYL) CHLOROPHOSPHONATE

Norman Van Gorder, Scotch Plains, and Walter D. Paist, Berkeley Heights, N. J., assignors to Celanese Corporation of America, New York, N. Y., a corporation of Delaware No Drawing. Original application May 18, 1950, Serial No. 162,824. Divided and this application February 23, 1951, Serial No. 212,526

3 Claims. (Cl. 260—461)

This invention relates to cellulose derivatives and relates more particularly to certain novel organic derivatives of cellulose, which are highly resistant to burning.

This application is a division of our copending application S. No. 162,824, filed May 18, 1950.

An object of this invention is the provision of flameproofing agents comprising certain novel haloalkylhalophosphonates which are adapted to be reacted with cellulose derivative materials having free hydroxy groups to render the same flameproof.

Other objects of this invention will appear from the following detailed description.

Organic derivatives of cellulose materials are thermoplastic and, when heated to an elevated temperature, may be softened sufficiently to cause them to flow. Since organic derivatives of cellulose materials are also flammable, the heat generated when said organic derivatives of cellulose materials are ignited results in a melting of the burning material and the resulting dripping of burning fragments of molten material greatly increases the fire hazard involved. Numerous proposals have been made for treating organic derivatives of cellulose materials with the object of rendering said organic derivatives of cellulose textile materials non-flammable. The suggested treatments usually involve the application of chemical agents such as ammonium compounds, for example, to the organic derivatives of cellulose materials. While the presence of these compounds on the organic derivatives of cellulose materials does reduce their flammability and their tendency to melt and drip when burning, the ammonium compounds as well as other types of compounds usually employed for such flameproofing treatments impart a somewhat stiff and harsh hand to the treated materials. Such a change in the hand of the treated materials is quite undesirable. Furthermore, the protective action achieved by such treatment is usually destroyed quite readily by either washing or dry-cleaning.

We have now found that organic derivatives of cellulose materials containing free hydroxyl groups may be rendered completely and permanently non-flammable by reacting the same with a haloalkyl ester of halophosphoric acid. An esterification reaction takes place resulting in the formation of a further ester linkage between the haloalkyl phosphate ester and the free hydroxy group or groups present in the cellulose derivative. Hydrogen chloride is split off as a by-product and the product obtained is a haloalkyl-phosphoric acid ester of the cellulose derivative employed. Since the secondary ester linkage formed between the phosphoric acid and the free hydroxy groups of the cellulose derivative is a chemical bond, neither washing nor dry-cleaning solvents have any harmful effect whatever on the protective action resulting from the esterification reaction. The action is permanent and is far more effective with the use of less material than in the case of materials applied merely to the surface.

The novel flameproofing agents of our invention have the following general formula

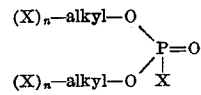

where $n$ is a whole number and at least 2 and X is selected from the group consisting of chlorine and bromine.

As examples of the novel haloalkyl-halophosphonates which may be employed for modifying said organic derivative of cellulose materials by reaction therewith to render the same non-flammable, there may be mentioned bis-(2,3-dichlorpropyl)-chloro-phosphonate and bis-(2,3-dibrom-propyl)-chloro-phosphonate.

The improved flame-proofing agents of our invention may be obtained by reacting phosphorus trichloride with an alkylene oxide, a halogenated aliphatic alcohol or a halogenated alkylene oxide and then chlorinating or brominating the haloalkyl phosphoric acid ester to convert the same to the corresponding phosphoric acid ester chloride or bromide. Thus, phosphorus trichloride may be reacted with 2,3-dibrompropanol-1 or 2,3-dichlorpropanol-1, for example, to form the corresponding triester of phosphorus acid. Upon chlorination, the phosphorus acid triester thus obtained is converted to the bischloralkyl ester of chlorphosphoric acid.

In order further to illustrate our invention but without being limited thereto, the following examples are given:

Example I 774 parts by weight of 2,3-dichloropropanol-1 are placed in a reaction vessel and 137 parts by weight of phosphorus trichloride are slowly added with stirring while maintaining the temperature constant at about 35° C. After standing for about 30 minutes, nitrogen gas is bubbled through the reaction mixture to remove any hydrogen chloride, and the product then distilled over barium carbonate under a pressure of about 5 mm. absolute. The fraction of the crude mixture which distills over when the temperature of the liquid is maintained at between 200 to 230° C. is collected.

124.4 parts by weight of the purified intermediate obtained as a product of the initial distillation is cooled to a temperature of 15° C. and chlorinated until about 20.5 parts by weight of chlorine are absorbed. The hydrogen chloride formed as a by-product is removed by bubbling nitrogen through the reaction mixture while maintaining the same under vacuum.

The product, comprising bis-(2,3-dichlorpropyl)-chlorophosphonate, may then be reacted with a cellulose derivative having free hydroxy groups to impart the desired non-flammable properties thereto.

Example II 109 parts by weight of 2,3-dibrompropanol-1 are placed in a reaction vessel and 22 parts by weight of phosphorus trichloride are slowly added with stirring while maintaining the temperature constant at about 10° C. After stirring for about 30 minutes chlorine gas is bubbled under the liquid surface with stirring and application of vacuum. This chlorination requires 30 minutes with the temperature maintained at 20° C. After addition of 200 parts by weight of benzene, hydrochloric acid gas is removed, together with benzene, by stirring and warming to 40° C. and application of vacuum which is gradually increased, over a period of about 3 hours, to about 2 mm. pressure.

The product, comprising bis-(2,3-dibrompropyl)-chlorophosphonate and dibrom-propyl chloride, may then be reacted with a cellulose derivative having free hydroxyl groups to impart the desired non-flammable properties thereto. The dibrompropyl chloride may be removed during isolation of the final cellulosic reaction product.

It is to be understood that the foregoing detailed description is given merely by way of illustration and that many variations may be made therein without departing from the spirit of our invention.

Having described our invention, what we desire to secure by Letters Patent is:

1. A phosphonate of the group consisting of bis-(2,3-dichlorpropyl)-chlorophosphonate and bis-(2,3-dibrompropyl)-chlorophosphonate.
2. Bis-(2,3-dichlorpropyl)-chlorophosphonate.
3. Bis-(2,3-dibrompropyl)-chlorophosphonate.

References Cited in the file of this patent

UNITED STATES PATENTS

| Number | Name | Date |
|---|---|---|
| 1,936,985 | Lommel | Nov. 28, 1933 |

OTHER REFERENCES

King, J. Chem. Soc. (London) (1914), pages 1258 and 1259.

Cook et al., J. Chem. Soc. (London) (1945), pages 873–874.